US012787127B2

(12) United States Patent
Yang et al.

(10) Patent No.: US 12,787,127 B2
(45) Date of Patent: Nov. 3, 2026

(54) INDUCTION COOKTOPS AND INDUCTION COOKTOP SYSTEMS

(71) Applicant: Rivian IP Holdings, LLC, Irvine, CA (US)

(72) Inventors: Fong Shyr Yang, Irvine, CA (US); Abishek Anchan, Irvine, CA (US)

(73) Assignee: Rivian IP Holdings, LLP, Irvine, CA (US)

( * ) Notice: Subject to any disclaimer, the term of this patent is extended or adjusted under 35 U.S.C. 154(b) by 875 days.

(21) Appl. No.: 18/175,479

(22) Filed: Feb. 27, 2023

(65) Prior Publication Data

US 2024/0292500 A1 Aug. 29, 2024

(51) Int. Cl.
*H05B 6/12* (2006.01)
*H05B 6/06* (2006.01)

(52) U.S. Cl.
CPC ........... *H05B 6/1254* (2013.01); *H05B 6/062* (2013.01)

(58) Field of Classification Search
CPC ........ H05B 6/129; H05B 6/36; H05B 6/1209; H05B 6/062; H05B 6/1254
See application file for complete search history.

(56) References Cited

U.S. PATENT DOCUMENTS 6,300,603 B1 * 10/2001 Edwards .................. H05B 3/68 219/447.1
7,135,658 B2 * 11/2006 Rael ........................ A47J 36/02 366/147
2023/0108631 A1 * 4/2023 Abadia Durango . H05B 6/1209 219/620

FOREIGN PATENT DOCUMENTS

EP 3484241 A1 * 5/2019 ........... H05B 6/1209

* cited by examiner

*Primary Examiner* — Nathaniel E Wiehe
*Assistant Examiner* — Daniel S Collins
(74) *Attorney, Agent, or Firm* — Patterson + Sheridan L.L.P.-Rivian

(57) ABSTRACT

An induction cooktop is provided. The induction cooktop may include a cooktop surface, an induction coil coupled to the cooktop surface, a control module coupled to the induction coil, and at least one magnet configured to fix a ferromagnetic cookware item to the cooktop surface. Alternatively, the induction cooktop may include a cooktop surface, a coil coupled to the cooktop surface, and a control module configured to provide a drive signal to the coil. In response to receiving an alternating current drive signal, the coil produces an oscillating magnetic field to heat a ferromagnetic cookware item placed on the cooktop surface, and, in response to receiving a direct current drive signal, the coil produces a non-oscillating magnetic field to fix the ferromagnetic cookware item to the cooktop surface.

18 Claims, 15 Drawing Sheets

INDUCTION COOKTOPS AND INDUCTION COOKTOP SYSTEMS

INTRODUCTION

The present disclosure relates to cooktops. More particularly, the present disclosure relates to induction cooktops and induction cooktop systems.

SUMMARY

Embodiments of the present disclosure advantageously fix (e.g., fasten, attach, secure, affix, couple, connect, retain, etc.) a ferromagnetic cookware item (e.g., a ferromagnetic pot, a ferromagnetic pan, etc.) to the surface of an induction cooktop to prevent movement of the ferromagnetic cookware item on the cooktop surface under various conditions. The ferromagnetic cookware item may be unfixed (e.g., unfastened, unattached, unsecured, un-affixed, uncoupled, unconnected, remove, etc.) from the cooktop surface when desired.

In certain embodiments, the induction cooktop includes a cooktop surface, an induction coil coupled to the cooktop surface, a control module coupled to the induction coil, and at least one magnet that is configured to fix a ferromagnetic cookware item to the cooktop surface. In certain embodiments, the magnet is a permanent magnet (or magnets), while in other embodiments, the magnet is an electromagnetic coil (or coils).

In certain embodiments, the induction coil and the electromagnetic coil are combined into a single coil. In certain embodiments, the control module is configured to provide an alternating current drive signal and a direct current drive signal to the coil. In response to receiving the alternating current drive signal, the coil produces an oscillating magnetic field to heat the ferromagnetic cookware item placed on the cooktop surface, and, in response to receiving the direct current drive signal, the coil produces a non-oscillating magnetic field to attract and hold the ferromagnetic cookware item to the cooktop surface.

DETAILED DESCRIPTION

Figure 1:
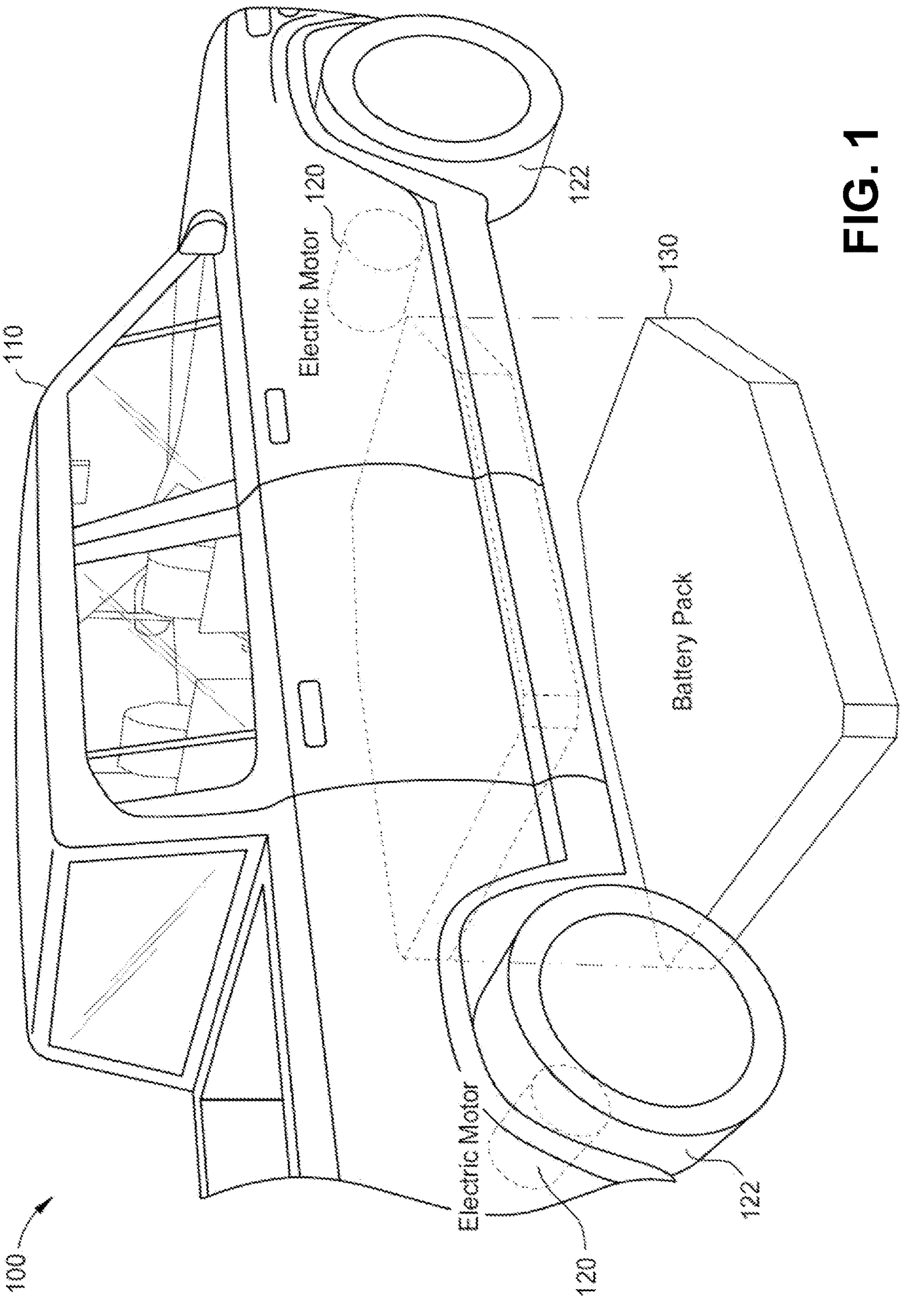
FIG. 1 depicts a diagram of an electric vehicle, in accordance with an embodiment of the present disclosure.

Induction cooktops indirectly heat a ferromagnetic cookware item, such as a cast iron skillet, a magnetic stainless steel pot, etc., by induction heating. The induction cooktop includes a cooktop surface, an induction coil located below the cooktop surface, and a power supply. The cookware item is placed on the cooktop surface above the induction coil. The power supply provides a high-frequency alternating current (AC) to the induction coil. In response, the induction coil produces a rapidly oscillating magnetic field that penetrates the cookware item and induces eddy currents that heat the cookware item. The power supply regulates the amount of heat generated in the cookware item by regulating the high-frequency alternating current provided to the induction coil.

The cooktop surface is made from a glass-ceramic material that has high heat-resistance, low thermal expansion and low thermal conductivity. Unfortunately, the glass-ceramic material also has a low friction coefficient, and the cookware item will simply slide off the cooktop surface when the cooktop surface is angled just a couple of degrees from the horizontal plane.

Accordingly, certain embodiments of the present disclosure are related to fixing (e.g., fastening, attaching, securing, affixing, coupling, connecting, retaining, etc.) a ferromagnetic cookware item (e.g., a ferromagnetic pot, a ferromagnetic pan, etc.) to the surface of an induction cooktop to prevent movement of the cookware item on the cooktop surface under various conditions. Such conditions may, for example, be present when the cooktop surface does not lie in a horizontal plane, when the induction cooktop is subject to forces due to acceleration and deceleration, when forces and moments (torques) are applied to the cookware item during cooking (e.g., stirring, mixing, blending, etc.), when forces and moments are applied to the cookware item when someone bumps into the cookware item, induction cooktop or it's platform or vehicle while in use, when someone enters or exits the vehicle, when someone loads or unloads heavy cargo from the vehicle, etc. Embodiments of the present disclosure also circumvent the need for placing protective material (such as a silicon mat or the like) on the surface of the induction cooktop as an attempt to retain the ferromagnetic cookware item, which may interfere with the generation of the magnetic field by the induction coil and does not effectively prevent the cookware item from sliding off the cooktop surface.

In many embodiments, the induction cooktop includes a cooktop surface, an induction coil coupled to the cooktop surface, a control module coupled to the induction coil, and at least one magnet that is configured to a ferromagnetic cookware item to the cooktop surface. In certain embodiments, the magnet is a permanent magnet (or magnets), while in other embodiments, the magnet is an electromagnetic coil (or coils). The ferromagnetic cookware item may be unfixed from the cooktop surface when desired.

The permanent magnet (or magnets) may be disposed around the induction coil, or the induction coil may be disposed around the permanent magnet. Similarly, the electromagnetic coil may be disposed around the induction coil, or the induction coil may be disposed around the electromagnetic coil. An electromagnetic shield may be disposed between the induction coil and electromagnetic coil to reduce interference. Additionally, the induction coil and the electromagnetic coil may include multiple, interspersed coil segments, and electromagnetic shields may be disposed between the induction coil segments and electromagnetic coil segments to reduce interference. In certain embodiments, an electromagnetic shield may be constructed from a non-ferrous material or a non-magnetic material, such as aluminum, copper, lead, tin, titanium and zinc, as well as copper alloys like brass and bronze, etc. In other embodiments, an electromagnetic shield may be constructed from ferromagnetic alloys materials such as iron, nickel, low carbon steel or cobalt. For example, MuMetal (80% nickel, 4.5% molybdenum, 15.5% iron) has a high magnetic permeability, so an electromagnetic shield formed from MuMetal, in the appropriate shape, will redirect the magnetic field generated by the electromagnetic coil away from the induction coil.

The control module may be coupled to the induction coil, and is configured to provide an alternating current drive signal to the induction coil. In certain embodiments, the control module is also coupled to the electromagnetic coil, and is configured to provide a direct current drive signal to the electromagnetic coil.

In certain embodiments, the induction coil and the electromagnetic coil are combined into a single coil. In such embodiments, the control module may be configured to asynchronously provide an alternating current drive signal and a direct current drive signal to the coil. In response to receiving the alternating current drive signal, the coil produces an oscillating magnetic field to heat the ferromagnetic cookware item placed on the cooktop surface, and, in response to receiving the direct current drive signal, the coil produces a non-oscillating magnetic field to fix the ferromagnetic cookware item to the cooktop surface.

In certain embodiments, the control module may include an asynchronous switching circuit to switch between an alternating current source that provides the alternating current drive signal, and a direct current source that provides the direct current drive signal. In other embodiments, the control module includes a microprocessor and drive signal generation circuitry that generates and provides the alternating current drive signal and the direct current drive signal to the coil at different times, at overlapping times or at the same time.

Note that embodiments of the present disclosure provide induction cooktops that may be used in any electric, hybrid or conventionally-powered conveyance, such as a car, SUV, truck, van, bus, boat, plane, train, etc. Generally, embodiments of the present disclosure may be advantageous in locations where the cooktop surface does not lie in a horizontal plane, and/or locations where the cooktop is subject to forces due to acceleration and deceleration, etc.

FIG. 1 depicts a diagram of an example electric vehicle 100, in accordance with an embodiment of the present disclosure.

Electric vehicle 100 generally includes a body, a propulsion system, an energy storage system, and an auxiliary or accessory system. The body 110 includes, inter alia, a frame or chassis, a driver/passenger compartment or cabin, stowage compartment(s), a suspension system, a steering system, etc. The propulsion system includes, inter alia, an electronic control unit (ECU), one, two or four (or more) electric motors 120 with associated transmissions and drivetrains, wheels 122, an inverter, etc. The energy storage system includes, inter alia, battery pack 130, a battery management system, a vehicle charging system including a vehicle charging port, etc. The auxiliary or accessory system includes, inter alia, an electrical power distribution system, a heating and air conditioning system, cabin displays, interior and exterior lighting systems, integrated electrical devices such as an induction cooktop system, etc. As shown, in FIGS. 9A and 9B, in certain embodiments, one or more of the cooktops described in relation to FIGS. 2 to 8B may be used onboard a vehicle, such as electric vehicle 100.

Figure 2:
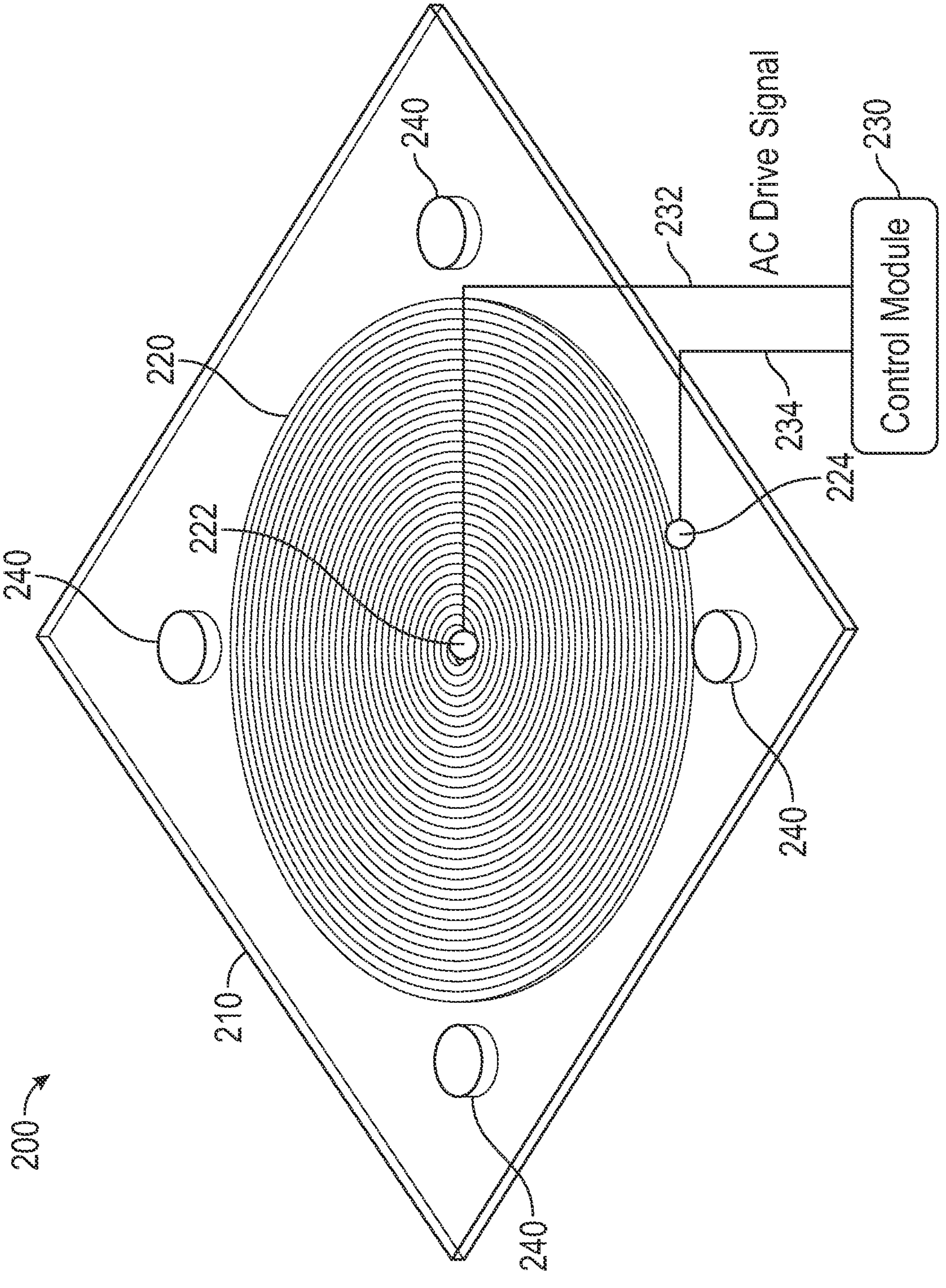
FIG. 2 depicts an example induction cooktop, in accordance with an embodiment of the present disclosure.

FIG. 2 depicts induction cooktop 200, in accordance with an embodiment of the present disclosure.

Induction cooktop 200 includes cooktop surface 210, induction coil 220, control module 230, and permanent magnets 240 that fix a ferromagnetic cookware item (not shown for clarity) to cooktop surface 210.

Cooktop surface 210 may be glass, ceramic, a glass ceramic material, or the like (e.g., a material with high heat-resistance, low thermal expansion and low thermal conductivity). Cooktop surface 210 includes an upper surface on which the ferromagnetic cookware item is placed, and a lower surface to which induction coil 220 is coupled. Induction coil 220 may be directly coupled (e.g., attached to, in contact with, etc.) to the lower surface of cooktop surface 210. Alternatively, induction coil 220 may be attached to a housing (not shown for clarity), and indirectly coupled to the cooktop surface 210 through an air gap.

In many embodiments, cooktop surface 210 may have a thickness between about 4 mm and about 8 mm. In certain embodiments, cooktop surface 210 may have a thickness somewhat less than 4 mm depending on, inter alia, the mechanical properties of the surface material (e.g., compressive strength, tensile strength, shear strength, etc.). Similarly, in certain embodiments, cooktop surface 210 may have a thickness greater than 8 mm depending on, inter alia, the magnetic properties of the surface material (e.g., permeability, etc.), which determines the strength of the magnetic field that is propagated to the upper surface of cooktop surface 210. In other words, if cooktop surface 210 has a thickness that is greater than a maximum thickness, the magnetic field propagated to the upper surface of cooktop surface 210 may fail to sufficiently fix the ferromagnetic cookware item to the upper surface. The ability of the propagated magnetic field to fix the ferromagnetic cookware item to the upper surface may also depend on the physical dimensions, magnetic permeability, etc., of the ferromagnetic cookware item.

Induction coil 220 forms a continuous loop of conductive metal wire, such as multi-strand copper wire, braided copper wire, Litz wire, etc. In certain embodiments, induction coil 220 is a bifilar coil that includes two coupled, parallel windings. Lead wire 232 couples inner termination 222 of induction coil 220 to control module 230, and lead wire 234 couples outer termination 224 of induction coil 220 to control module 230.

Control module 230 is configured to provide an alternating current drive signal over lead wires 232, 234 to induction coil 220, which produces an oscillating magnetic field in response to receiving the alternating current drive signal. As described above, this oscillating magnetic field penetrates the ferromagnetic cookware item and induces eddy currents that heat the ferromagnetic cookware item (and the food or liquid contained therein) placed on cooktop surface 210. In many embodiments, the alternating current drive signal is a high-frequency signal (i.e., above 20 kHz).

In certain embodiments, control module 230 includes a microcontroller and drive signal generation circuitry that generate the alternating current drive signal. The drive signal generation circuitry includes, inter alia, capacitors, resistors, diodes, insulated-gate bipolar transistors (IGBTs), etc. Induction coil 220 (and the ferromagnetic cookware item placed thereon) and a portion of the drive signal generation circuitry form a series resonant LC circuit. The microcontroller provides a pulse width modulated (PWM) signal to at least one IGBT, which generates the alternating current drive signal that is output over lead wires 232, 234. The drive signal generation circuitry includes a tuning capacitors and resistors to tune the series resonant LC circuit to operate efficiently.

In certain other embodiments, control module 230 includes a self-oscillating half-bridge gate driver integrated circuit (IC) and drive signal generation circuitry that generate the alternating current drive signal. The drive signal generation circuitry includes, inter alia, capacitors, resistors, diodes, metal-oxide-semiconductor field-effect transistors (MOSFETs), etc. Induction coil 220 (and the ferromagnetic cookware item placed thereon) and a portion of the drive signal generation circuitry form a series resonant LC circuit. The gate driver IC controls the MOSFETs, which generate the alternating current drive signal that is output over lead wires 232, 234. The drive signal generation circuitry includes a tuning capacitors and resistors to tune the series resonant LC circuit to operate efficiently.

Other control techniques may also be used.

Permanent magnets 240 are formed from a ferromagnetic material or alloys including ferromagnetic material(s). In certain embodiments, permanent magnets 240 may be formed from magnetite ($Fe_3O_4$) or various alloys, including copper, iron and titanium, aluminum, nickel and cobalt (alnico), ceramic/ferrite (strontium carbonate and iron oxide), neodymium-iron-boron (Nd—Fe—B or NIB), samarium-cobalt (SmCo), etc. In the embodiment depicted in FIG. 2, four permanent magnets 240 are evenly disposed around induction coil 220. In other embodiments, fewer permanent magnets 240 may be disposed around induction coil 220 (e.g., two or three), or additional permanent magnets 240 may be disposed around induction coil 220 (e.g., five or more). In certain embodiments, an electromagnetic shield (not depicted for clarity) may be disposed between induction coil 220 and permanent magnets 240 to reduce electromagnetic interference. Further, note that although FIG. 2 shows permanent magnets 240 being evenly disposed around induction coil 220, in other embodiments, permanent magnets 240 may be unevenly arranged.

Figure 3:
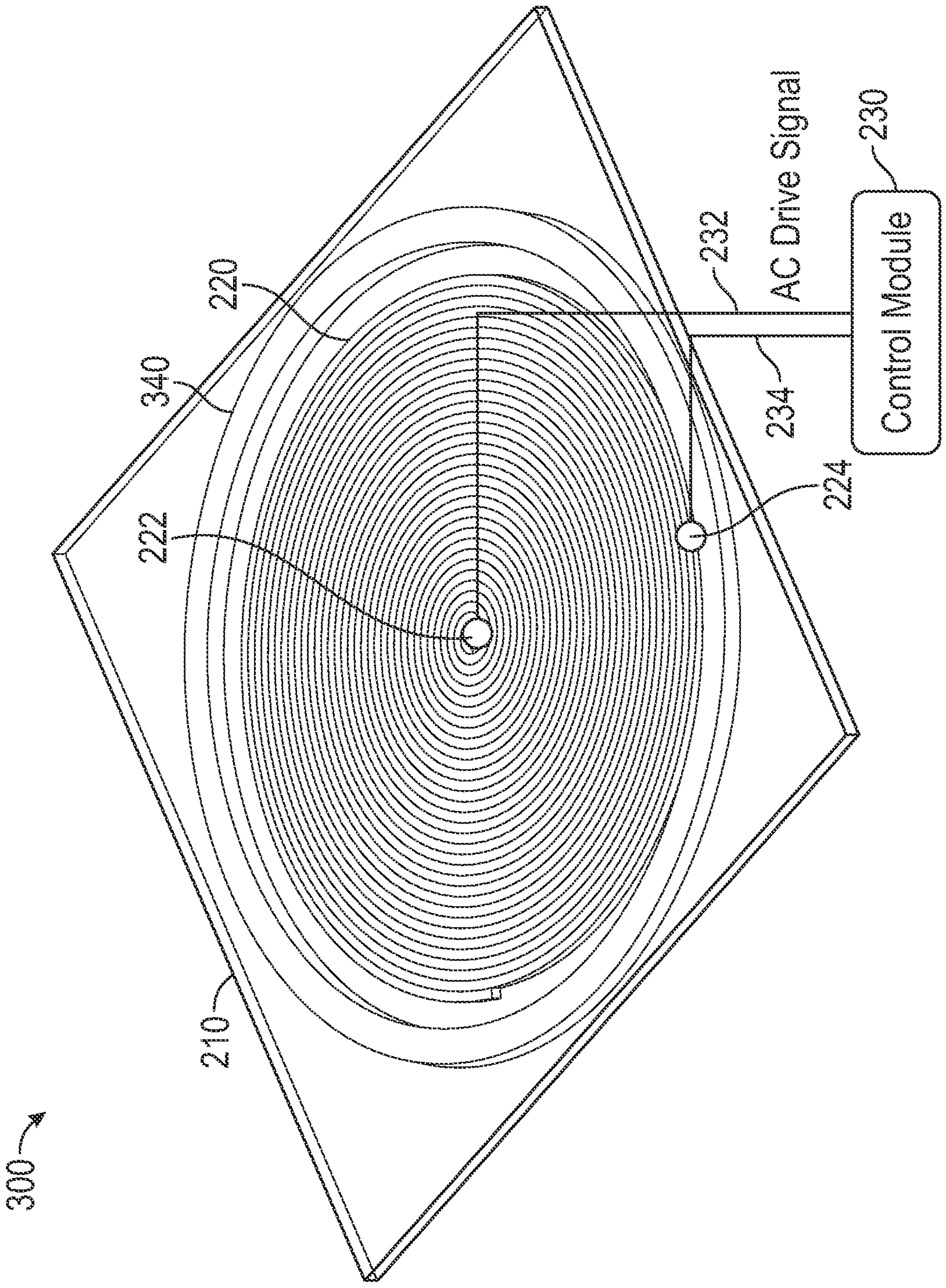
FIG. 3 depicts an example induction cooktop, in accordance with an embodiment of the present disclosure.

FIG. 3 depicts induction cooktop 300, in accordance with an embodiment of the present disclosure.

Induction cooktop 300 includes cooktop surface 210, induction coil 220, control module 230, and permanent magnet 340 that fixes a ferromagnetic cookware item (not shown for clarity) to cooktop surface 210. Lead wire 232 couples inner termination 222 of induction coil 220 to control module 230, lead wire 234 couples outer termination 224 of induction coil 220 to control module 230, and control module 230 is configured to provide an alternating current drive signal over lead wires 232, 234 to induction coil 220.

In the embodiment shown in FIG. 3, permanent magnet 340 is a single, ring-shaped magnet that is disposed around induction coil 220. Other embodiments may include a segmented ring-shaped magnet, a single or segmented oval-shaped magnet, a single or segmented elliptical-shaped magnet, a single or segmented square-shaped magnet, a single or segmented rectangular-shaped magnet, a single or segmented hexagonal-shaped magnet, etc. As described above, permanent magnet 340 is formed from a ferromagnetic material or alloys including ferromagnetic materials. In certain embodiments, an electromagnetic shield (not depicted for clarity) may be disposed between induction coil 220 and permanent magnet 340 to reduce electromagnetic interference.

Figure 4:
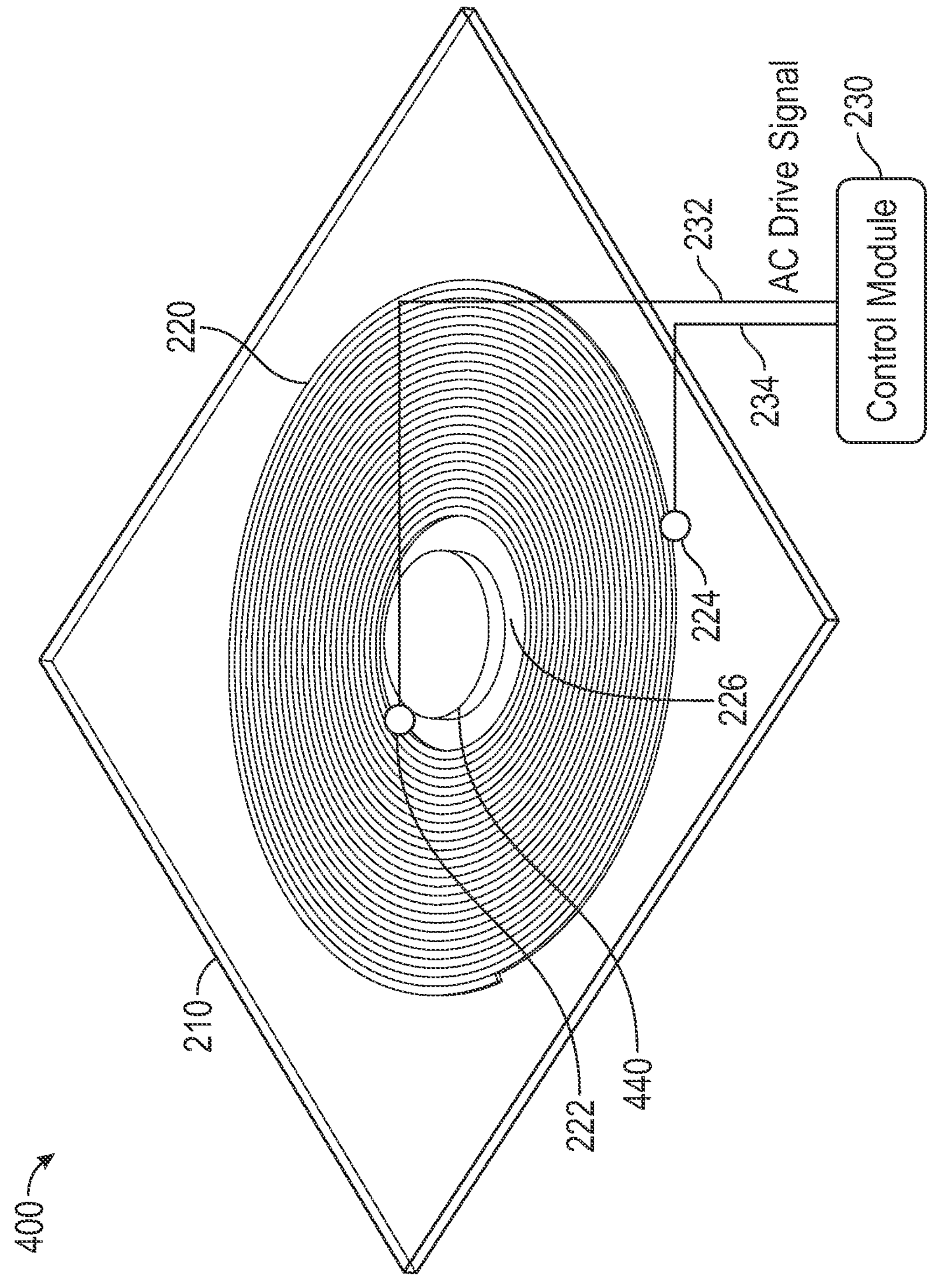
FIG. 4 depicts an example induction cooktop, in accordance with an embodiment of the present disclosure.

FIG. 4 depicts induction cooktop 400, in accordance with an embodiment of the present disclosure.

Induction cooktop 400 includes cooktop surface 210, induction coil 220, control module 230, and permanent magnet 440 that fixes a ferromagnetic cookware item (not shown for clarity) to cooktop surface 210. Lead wire 232 couples inner termination 222 of induction coil 220 to control module 230, lead wire 234 couples outer termination 224 of induction coil 220 to control module 230, and control module 230 is configured to provide an alternating current drive signal over lead wires 232, 234 to induction coil 220.

In the embodiment depicted in FIG. 4, permanent magnet 440 is a single circular magnet that is disposed within an inner boundary area 226 formed by induction coil 220. While permanent magnet 440 is depicted as circular, other shapes, such as oval, elliptical, square, rectangular, hexagonal, etc., are also within the scope of the disclosure. As described above, permanent magnet 440 is formed from a ferromagnetic material or alloys including ferromagnetic materials. In certain embodiments, an electromagnetic shield (not depicted for clarity) may be disposed between induction coil 220 and permanent magnet 440 to reduce electromagnetic interference.

Figure 5:
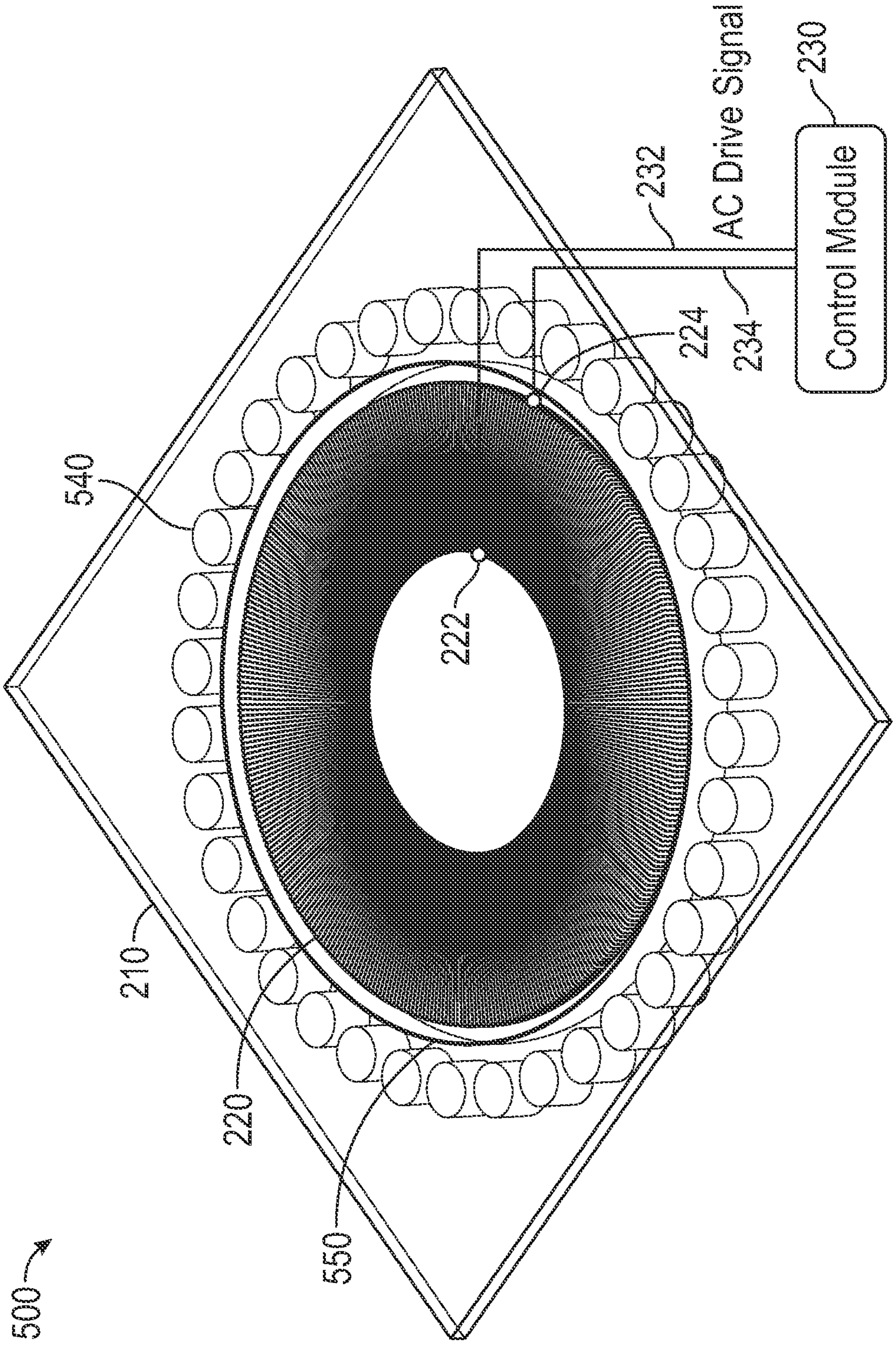
FIG. 5 depicts of an example induction cooktop, in accordance with an embodiment of the present disclosure.

FIG. 5 depicts induction cooktop 500, in accordance with an embodiment of the present disclosure.

Induction cooktop 500 includes cooktop surface 210, induction coil 220, control module 230, permanent magnets 540 that fix a ferromagnetic cookware item (not shown for clarity) to cooktop surface 210, and electromagnetic shield 550 to reduce the electromagnetic interference between induction coil 220 and permanent magnets 540. Lead wire 232 couples inner termination 222 of induction coil 220 to control module 230, lead wire 234 couples outer termination 224 of induction coil 220 to control module 230, and control module 230 is configured to provide an alternating current drive signal over lead wires 232, 234 to induction coil 220.

Similar to induction cooktop 200, permanent magnets 540 are disposed around induction coil 220. As described above, permanent magnets 540 are formed from a ferromagnetic material or alloys including ferromagnetic materials. In the embodiment depicted in FIG. 5, thirty six permanent magnets 540 are evenly disposed around induction coil 220. In other embodiments, fewer permanent magnets 540 may be disposed around induction coil 220 in one or more concentric circles, or additional permanent magnets 540 may be disposed around induction coil 220 in one or more concentric circles. Further, note that although FIG. 5 shows permanent magnets 540 being evenly disposed around induction coil 220, in other embodiments, permanent magnets 540 may be unevenly arranged.

Figure 6A:
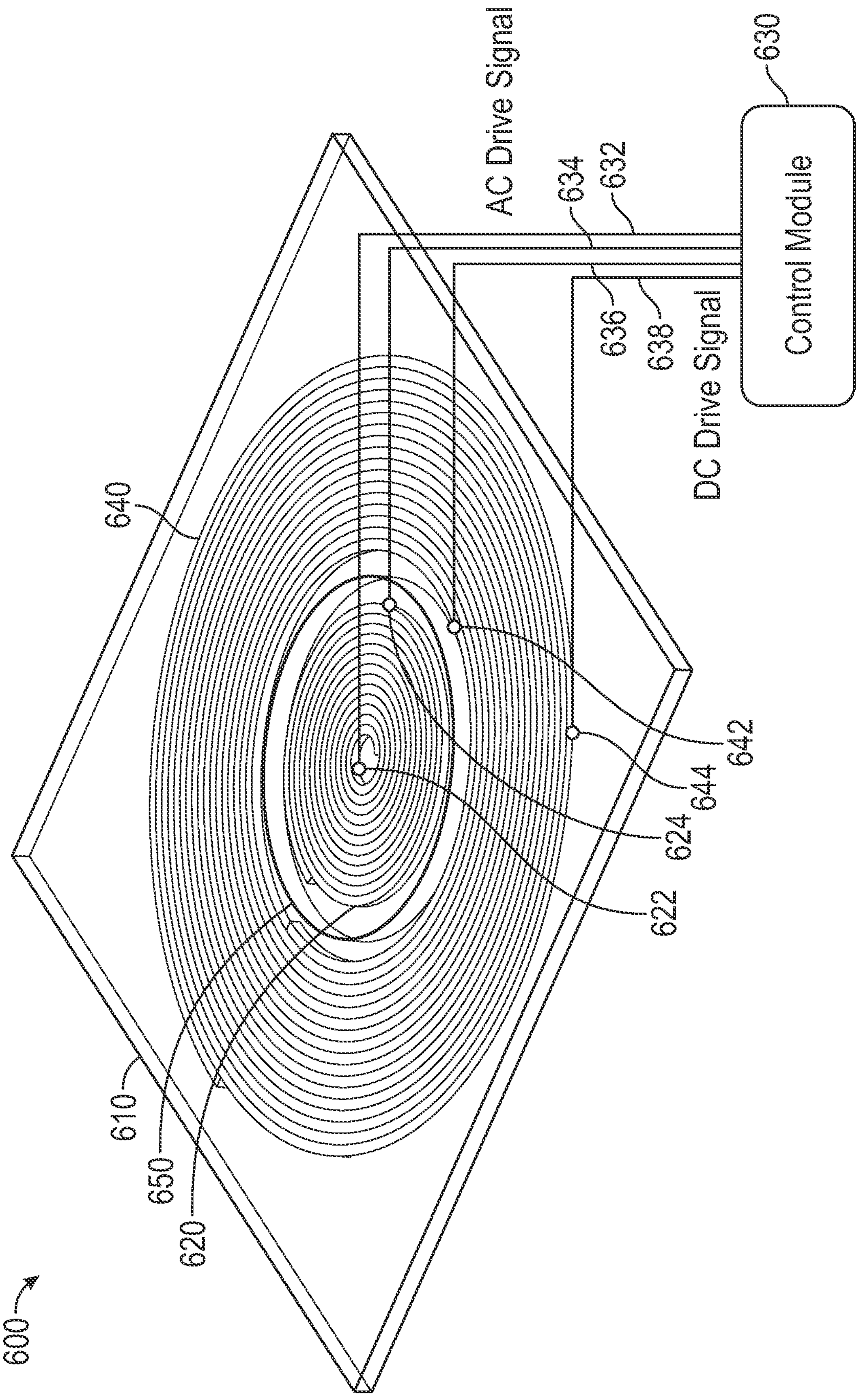
FIG. 6A depicts an example induction cooktop, in accordance with an embodiment of the present disclosure.

FIG. 6A depicts induction cooktop 600, in accordance with an embodiment of the present disclosure.

Induction cooktop 600 includes cooktop surface 610, induction coil 620, control module 630, electromagnetic coil 640 that fixes a ferromagnetic cookware item (not shown for clarity) to cooktop surface 610, and electromagnetic shield 650. In the embodiment shown in FIG. 6A, electromagnetic coil 640 is disposed around induction coil 620, and electromagnetic shield 650 is disposed between induction coil 620 and electromagnetic coil 640 to reduce electromagnetic interference.

Similar to cooktop surface 210, cooktop surface 610 may be glass, ceramic, a glass-ceramic material, or the like (e.g., a material with high heat-resistance, low thermal expansion and low thermal conductivity). Cooktop surface 610 includes an upper surface on which the ferromagnetic cookware item is placed, and a lower surface to which induction coil 620 and electromagnetic coil 640 are coupled. Induction coil 620 may be directly coupled (e.g., attached to, in contact with, etc.) to the lower surface of cooktop surface 610; alternatively, induction coil 620 may be attached to a housing (not shown for clarity), and indirectly coupled to the cooktop surface 610 through an air gap.

Similar to induction coil 220, induction coil 620 forms a continuous loop of conductive metal wire, such as multi-strand copper wire, braided copper wire, Litz wire, etc. In certain embodiments, induction coil 620 is a bifilar coil that includes two coupled, parallel windings. Lead wire 632 couples inner termination 622 of induction coil 620 to control module 630, and lead wire 634 couples outer termination 624 of induction coil 620 to control module 630.

Electromagnetic coil 640 forms a continuous loop of conductive metal wire, such as multi-strand copper wire, braided copper wire, Litz wire, etc. In certain embodiments, electromagnetic coil 640 is a bifilar coil that includes two coupled, parallel windings. Lead wire 636 couples inner termination 642 of electromagnetic coil 640 to control module 630, and lead wire 638 couples outer termination 644 of electromagnetic coil 640 to control module 630.

Control module 630 is configured to provide an alternating current drive signal over lead wires 632, 634 to induction coil 620, which produces an oscillating magnetic field in response to receiving the alternating current drive signal. As described above, this oscillating magnetic field penetrates the ferromagnetic cookware item and induces eddy currents that heat the ferromagnetic cookware item (and the food or liquid contained therein) placed on cooktop surface 610. In many embodiments, the alternating current drive signal is a high-frequency signal (i.e., above 20 kHz).

Control module 630 is also configured to provide a direct current drive signal over lead wires 636, 638 to electromagnetic coil 640, which produces a non-oscillating magnetic field in response to receiving the direct current drive signal. This non-oscillating magnetic field fixes the ferromagnetic cookware item to cooktop surface 610.

In certain embodiments, control module 630 includes a microprocessor and drive signal generation circuitry that generate the alternating current drive signal. The drive signal generation circuitry includes, inter alia, capacitors, resistors, diodes, insulated-gate bipolar transistors (IGBTs), etc. Induction coil 620 (and the ferromagnetic cookware item placed thereon) and a portion of the drive signal generation circuitry form a series resonant LC circuit. The microprocessor provides a PWM signal to at least one IGBT, which generates the alternating current drive signal that is output over lead wires 632,634. The drive signal generation circuitry includes a tuning capacitors and resistors to tune the series resonant LC circuit to operate efficiently.

In other embodiments, control module 630 includes a self-oscillating half-bridge gate driver integrated circuit (IC) and drive signal generation circuitry that generate the alternating current drive signal. The drive signal generation circuitry includes, inter alia, capacitors, resistors, diodes, metal-oxide-semiconductor field-effect transistors (MOSFETs), etc. Induction coil 620 (and the ferromagnetic cookware item placed thereon) and a portion of the drive signal generation circuitry form a series resonant LC circuit. The gate driver IC controls the MOSFETs, which generate the alternating current drive signal that is output over lead wires 632,634. The drive signal generation circuitry includes a tuning capacitors and resistors to tune the series resonant LC circuit to operate efficiently.

Other control techniques may also be used.

Figure 6B:
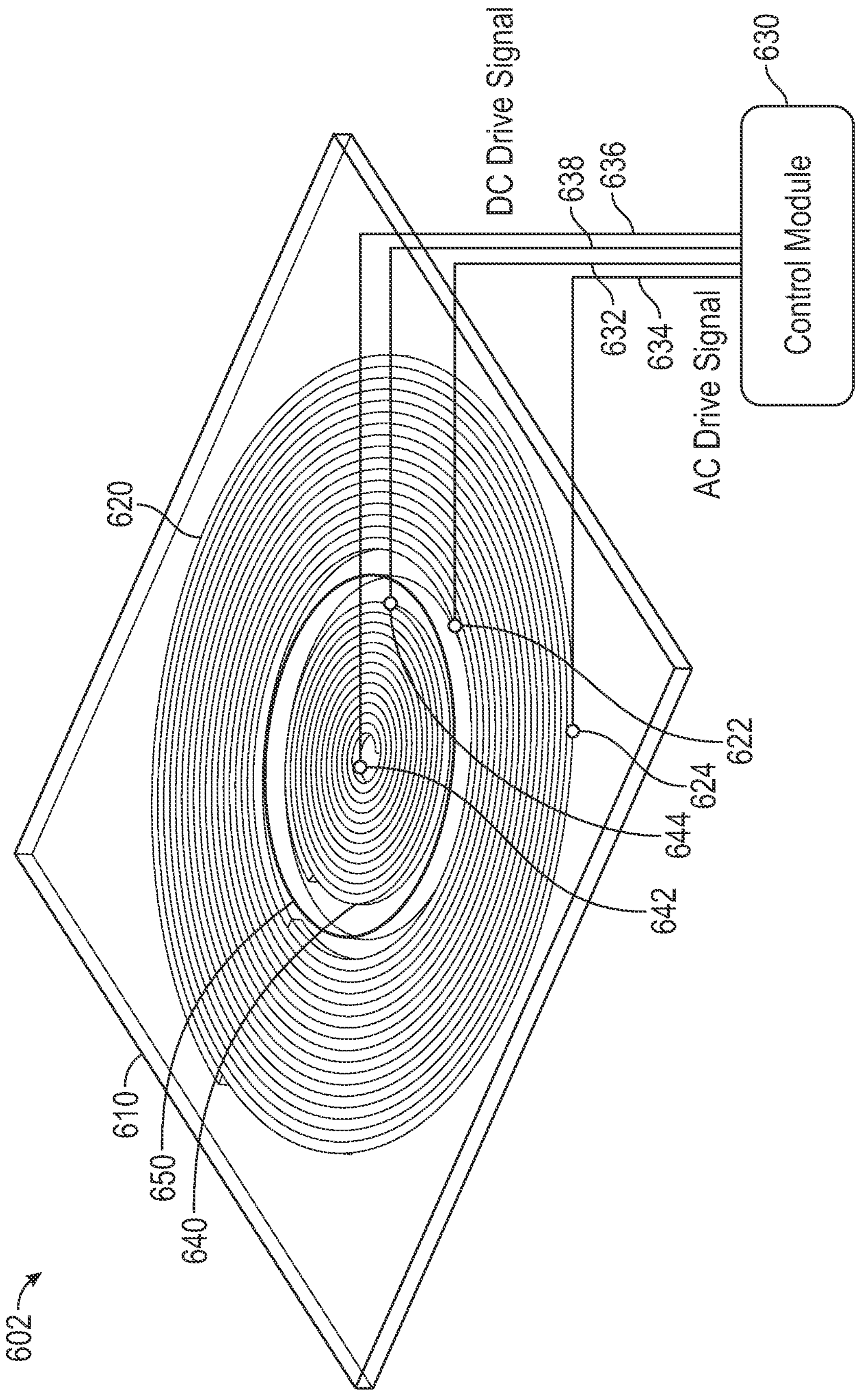
FIG. 6B depicts an example induction cooktop, in accordance with an embodiment of the present disclosure.

FIG. 6B depicts induction cooktop 602, in accordance with an embodiment of the present disclosure.

Similar to induction cooktop 600 depicted in FIG. 6A, induction cooktop 602 includes cooktop surface 610, induction coil 620, control module 630, electromagnetic coil 640 that fixes a ferromagnetic cookware item (not shown for clarity) to cooktop surface 610, and electromagnetic shield 650. In the embodiment shown in FIG. 6B, induction coil 620 is disposed around electromagnetic coil 640, and electromagnetic shield 650 is disposed between induction coil 620 and electromagnetic coil 640 to reduce electromagnetic interference.

Figure 6C:
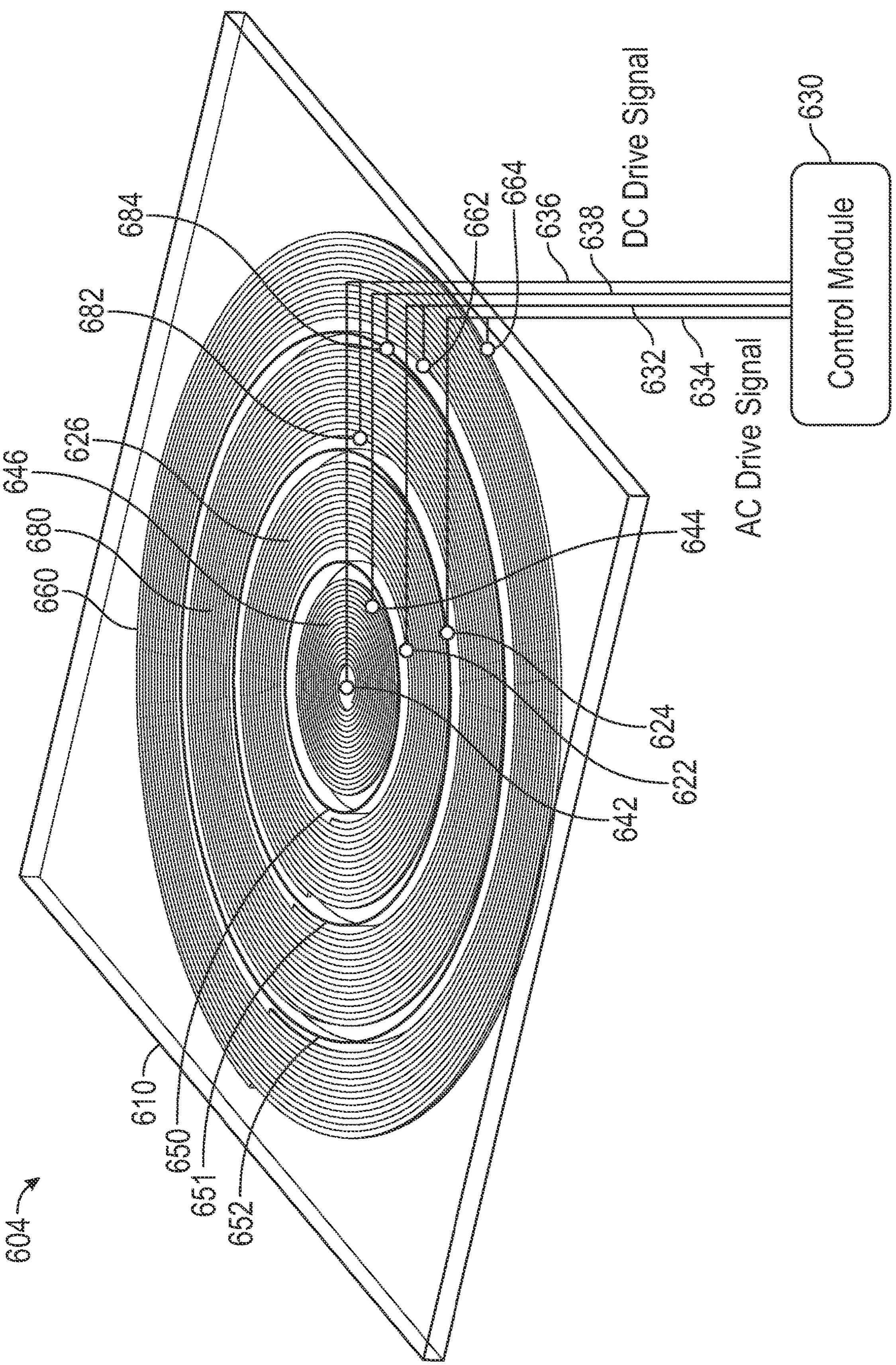
FIG. 6C depicts an example induction cooktop, in accordance with an embodiment of the present disclosure.

FIG. 6C depicts induction cooktop 604, in accordance with an embodiment of the present disclosure.

Induction cooktop 604 includes cooktop surface 610, inner induction coil segment 626, outer induction coil segment 660, control module 630, inner electromagnetic coil segment 646, outer electromagnetic coil segment 680, and electromagnetic shields 650, 651, 652. Inner induction coil segment 626 and outer induction coil segment 660 cooperate to heat the ferromagnetic cookware item (not shown for clarity) placed on cooktop surface 610, while inner electromagnetic coil segment 646 and outer electromagnetic coil segment 680 cooperate to fix the ferromagnetic cookware item to cooktop surface 610. In this embodiment, induction coil 620 has been divided into inner and outer segments, and the electromagnetic coil 640 has been divided into inner and outer segments.

To reduce electromagnetic interference, electromagnetic shield 650 is disposed between inner induction coil segment 626 and inner electromagnetic coil segment 646, electromagnetic shield 651 is disposed between inner electromagnetic coil segment 646 and outer induction coil segment 660, and electromagnetic shield 652 is disposed between outer induction coil segment 660 and outer electromagnetic coil segment 680.

Lead wire 632 couples inner termination 622 of inner induction coil segment 626 and inner termination 662 of outer induction coil segment 660 to control module 630, and lead wire 634 couples outer termination 624 of inner induction coil segment 626 and outer termination 664 of outer induction coil segment 660 to control module 630. Lead wire 636 couples inner termination 642 of inner electromagnetic coil segment 646 and inner termination 682 of outer electromagnetic coil segment 680 to control module 630, and lead wire 638 couples outer termination 644 of inner electromagnetic coil segment 646 and outer termination 684 of outer electromagnetic coil segment 680 to control module 630.

In other words, the induction coil includes inner induction coil segment 626 coupled to outer induction coil segment 660, and the electromagnetic coil includes inner electromagnetic coil segment 646 coupled to outer electromagnetic coil segment 680, while inner electromagnetic coil segment 646 is disposed within inner induction coil segment 626, and outer electromagnetic coil segment 680 is disposed between inner induction coil segment 626 and outer induction coil segment.

Figure 7A:
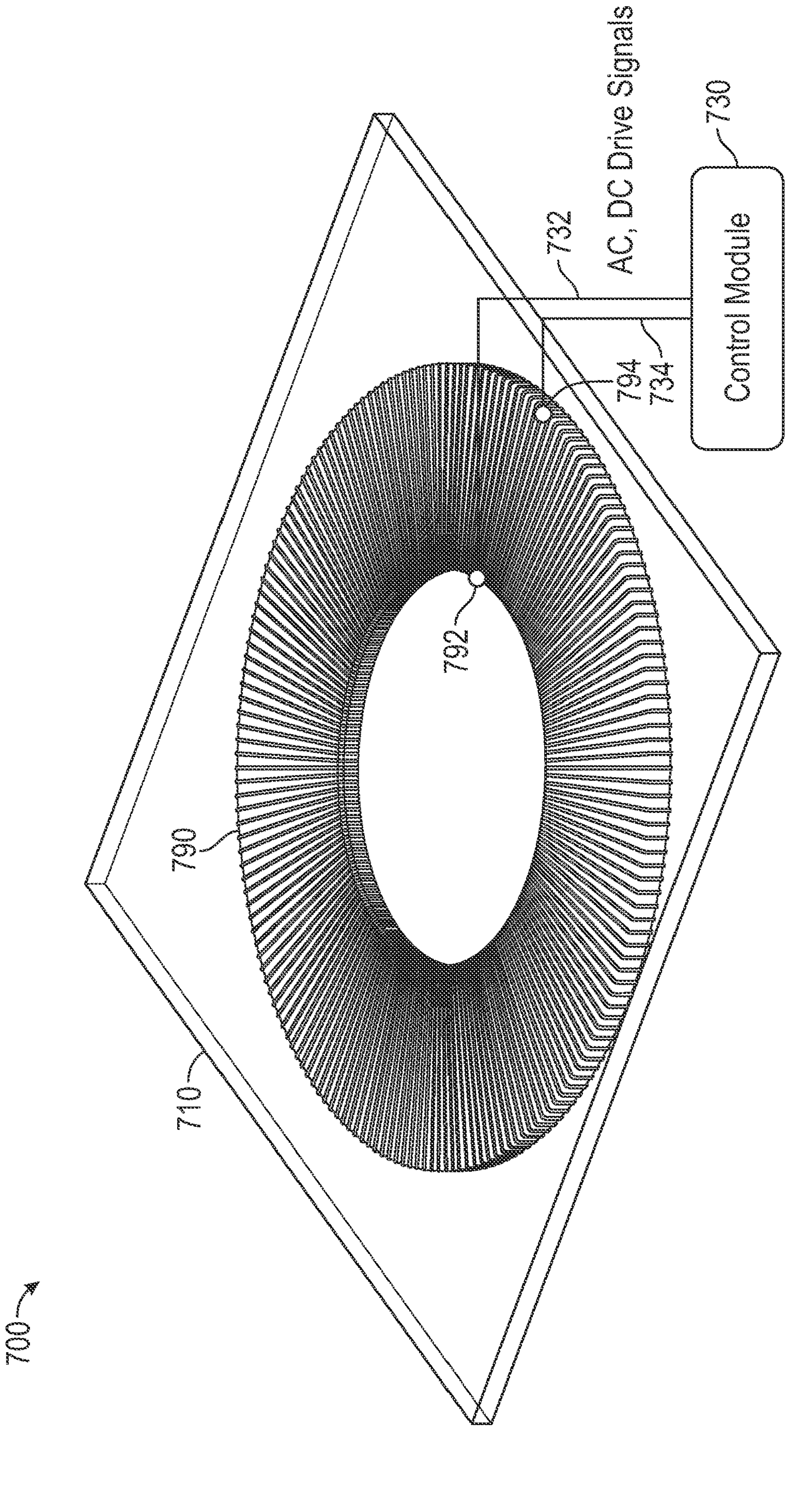
FIG. 7A depicts an example induction cooktop with a single coil, in accordance with an embodiment of the present disclosure.

FIG. 7A depicts induction cooktop 700 with a single coil, in accordance with an embodiment of the present disclosure.

Induction cooktop 700 includes cooktop surface 710, coil 790, and control module 730. In response to receiving an alternating current drive signal from control module 730, coil 790 produces an oscillating magnetic field to heat a ferromagnetic cookware item (not depicted for clarity) placed on cooktop surface 710. In response to receiving a direct current drive signal from control module 730, coil 790 produces a non-oscillating magnetic field to fix the ferromagnetic cookware item to the cooktop surface.

Similar to cooktop surface 210, cooktop surface 710 may be glass, ceramic, a glass-ceramic material, or the like (e.g., a material with high heat-resistance, low thermal expansion and low thermal conductivity). Cooktop surface 710 includes an upper surface on which the ferromagnetic cookware item is placed, and a lower surface to which coil 790 is coupled. Coil 790 may be directly coupled (e.g., attached to, in contact with, etc.) to the lower surface of cooktop surface 710; alternatively, coil 790 may be attached to a housing (not shown for clarity), and indirectly coupled to the cooktop surface 710 through an air gap.

Similar to induction coil 220, coil 790 forms a continuous loop of conductive metal wire, such as multi-strand copper wire, braided copper wire, Litz wire, etc. In certain embodiments, coil 790 is a bifilar coil that includes two coupled, parallel windings. Lead wire 732 couples inner termination 792 of coil 790 to control module 730, and lead wire 734 couples outer termination 794 of coil 790 to control module 730.

Control module 730 is configured to provide an alternating current drive signal over lead wires 732, 734 to coil 790, which produces an oscillating magnetic field in response to receiving the alternating current drive signal. As described above, this oscillating magnetic field penetrates the ferromagnetic cookware item and induces eddy currents that heat the ferromagnetic cookware item (and the food or liquid contained therein) placed on cooktop surface 710. In many embodiments, the alternating current drive signal is a high-frequency signal (i.e., above 20 kHz).

Control module 730 is also configured to provide a direct current drive signal over lead wires 732, 734 to coil 790, which produces a non-oscillating magnetic field in response to receiving the direct current drive signal. This non-oscillating magnetic field fixes the ferromagnetic cookware item to cooktop surface 710.

In certain embodiments, control module 730 includes a microprocessor and drive signal generation circuitry that generate the alternating current drive signal. The drive signal generation circuitry includes, inter alia, capacitors, resistors, diodes, insulated-gate bipolar transistors (IGBTs), etc. The coil 790 (and the ferromagnetic cookware item placed thereon) and a portion of the drive signal generation circuitry form a series resonant LC circuit. The microprocessor provides a PWM signal to at least one IGBT, which generates the alternating current drive signal that is output over lead wires 732, 734. The drive signal generation circuitry includes a tuning capacitors and resistors to tune the series resonant LC circuit to operate efficiently.

In other embodiments, control module 730 includes a self-oscillating half-bridge gate driver integrated circuit (IC) and drive signal generation circuitry that generate the alternating current drive signal. The drive signal generation circuitry includes, inter alia, capacitors, resistors, diodes, metal-oxide-semiconductor field-effect transistors (MOSFETs), etc. Coil 790 (and the ferromagnetic cookware item placed thereon) and a portion of the drive signal generation circuitry form a series resonant LC circuit. The gate driver IC controls the MOSFETs, which generate the alternating current drive signal that is output over lead wires 732, 734. The drive signal generation circuitry includes a tuning capacitors and resistors to tune the series resonant LC circuit to operate efficiently.

In certain embodiments, the direct current drive signal is provided at different times (i.e., asynchronously), and may include a time delay between the waveforms of the direct current drive signal and the alternating current drive signal to reduce magnetic latency. In certain other embodiments, the direct current drive signal is provided at overlapping times. In certain other embodiments, the direct current drive signal is provided at the same time (i.e., synchronously).

In certain embodiments, the direct current drive signal is provided as a dc bias within the alternating current drive signal.

Figure 7B:
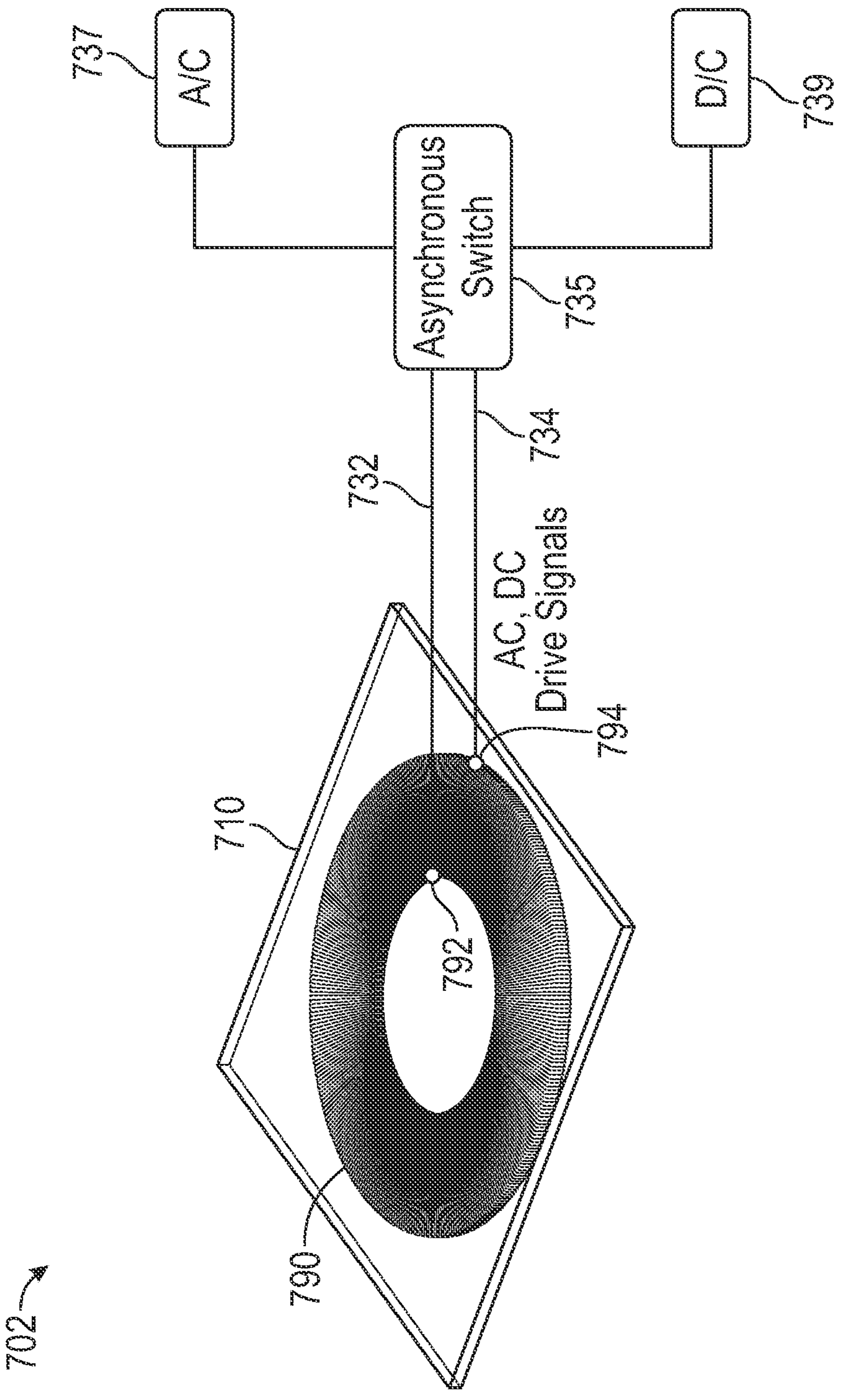
FIG. 7B depicts an example induction cooktop with a single coil, in accordance with an embodiment of the present disclosure.

FIG. 7B depicts induction cooktop 702 with a single coil, in accordance with an embodiment of the present disclosure.

Induction cooktop 702 includes cooktop surface 710, coil 790, asynchronous switch 735, ac drive signal source 737, and dc drive signal source 739. Asynchronous switch 735 switches lead wires 732, 734 between ac drive signal source 737 and dc drive signal source 739 to provide either an ac drive signal or a dc drive signal to coil 790. In response to receiving an alternating current drive signal from asynchronous switch 735, coil 790 produces an oscillating magnetic field to heat a ferromagnetic cookware item (not depicted for clarity) placed on cooktop surface 710. In response to receiving a direct current drive signal from asynchronous switch 735, coil 790 produces a non-oscillating magnetic field to fix the ferromagnetic cookware item to the cooktop surface.

In the embodiment depicted in FIG. 7B, asynchronous switch 735 provides alternating current drive signal and direct current drive signal to coil 790 at different times (i.e., asynchronously).

Figure 7C:
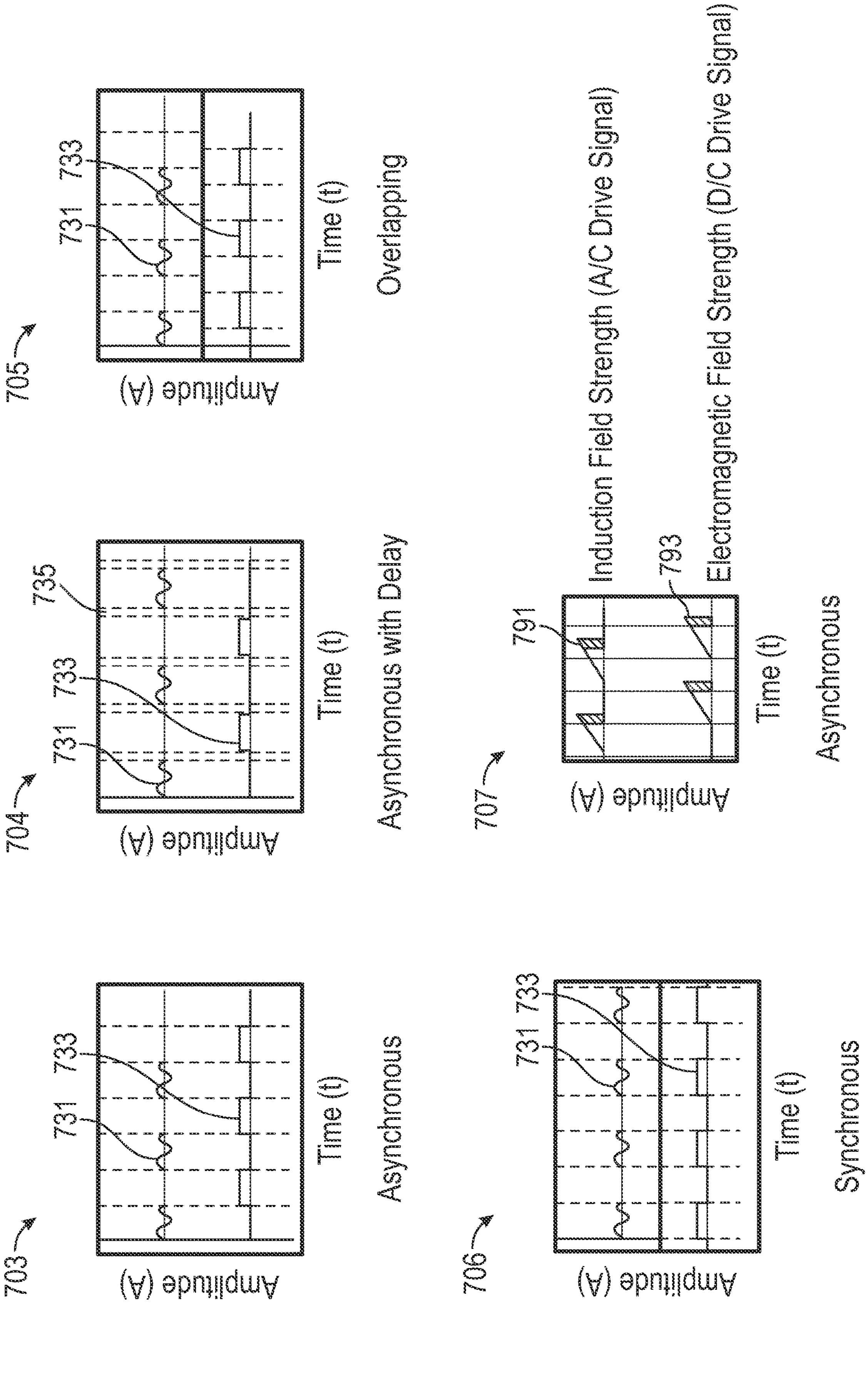
FIG. 7C depicts example amplitude vs. time graphs for alternating current drive signals, direct current drive signals, induction field strength, and electromagnetic field strength, in accordance with embodiments of the present disclosure.

FIG. 7C depicts example amplitude vs. time graphs for alternating current drive signals, direct current drive signals, induction field strength and electromagnetic field strength, in accordance with embodiments of the present disclosure.

Graph 703 depicts asynchronous alternating current drive signal 731 and direct current drive signal 733 corresponding to the induction cooktops illustrated in FIGS. 6A, 6B, 6C, 7A and 7B. Graph 704 depicts delayed asynchronous alternating current drive signal 731 and direct current drive signal 733 corresponding to the induction cooktops illustrated in FIGS. 6A, 6B, 6C, 7A and 7B. A delay 735 separates each waveform of alternating current drive signal 731 and direct current drive signal 733. Graph 705 depicts overlapping alternating current drive signal 731 and direct current drive signal 733 corresponding to the induction cooktops illustrated in FIGS. 6A, 6B, 6C, 7A and 7B. Graph 706 depicts synchronous alternating current drive signal 731 and direct current drive signal 733 corresponding to the induction cooktops illustrated in FIGS. 6A, 6B, 6C, 7A and 7B. Graph 707 depicts asynchronous induction field strength 791 and electromagnetic field strength 793 corresponding to the induction cooktops illustrated in FIGS. 6A, 6B, 6C, 7A and 7B.

Figure 8A:
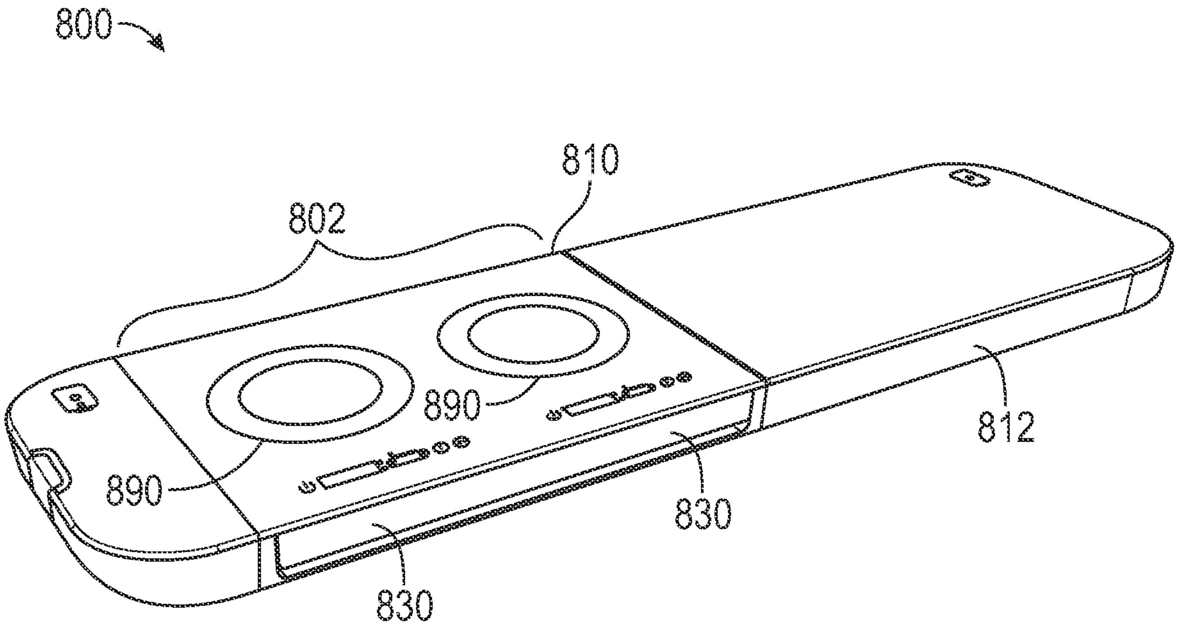
FIG. 8A depicts an example induction cooktop system for a vehicle, in accordance with an embodiment of the present disclosure.

FIG. 8A depicts an example induction cooktop system for a vehicle, in accordance with an embodiment of the present disclosure.

Induction cooktop system 800 integrates two (or more) induction cooktops, such as induction cooktops 200, 300, 400, 500, 600, 602, 604, 700, 702 (described above), into induction cooktop 802 which is mounted in frame 812. Induction cooktop system 800 may integrate the same induction cooktop embodiment or different induction cooktop embodiments (e.g., induction cooktop 200 and induction cooktop 200, induction cooktop 200 and induction cooktop 300, etc.). As depicted in FIG. 8A, induction cooktop 802 may include cooktop surface 810, two (or more) coils 890 and two (or more) control modules 830. Each control module 830 controls a single coil 890.

Figure 8B:
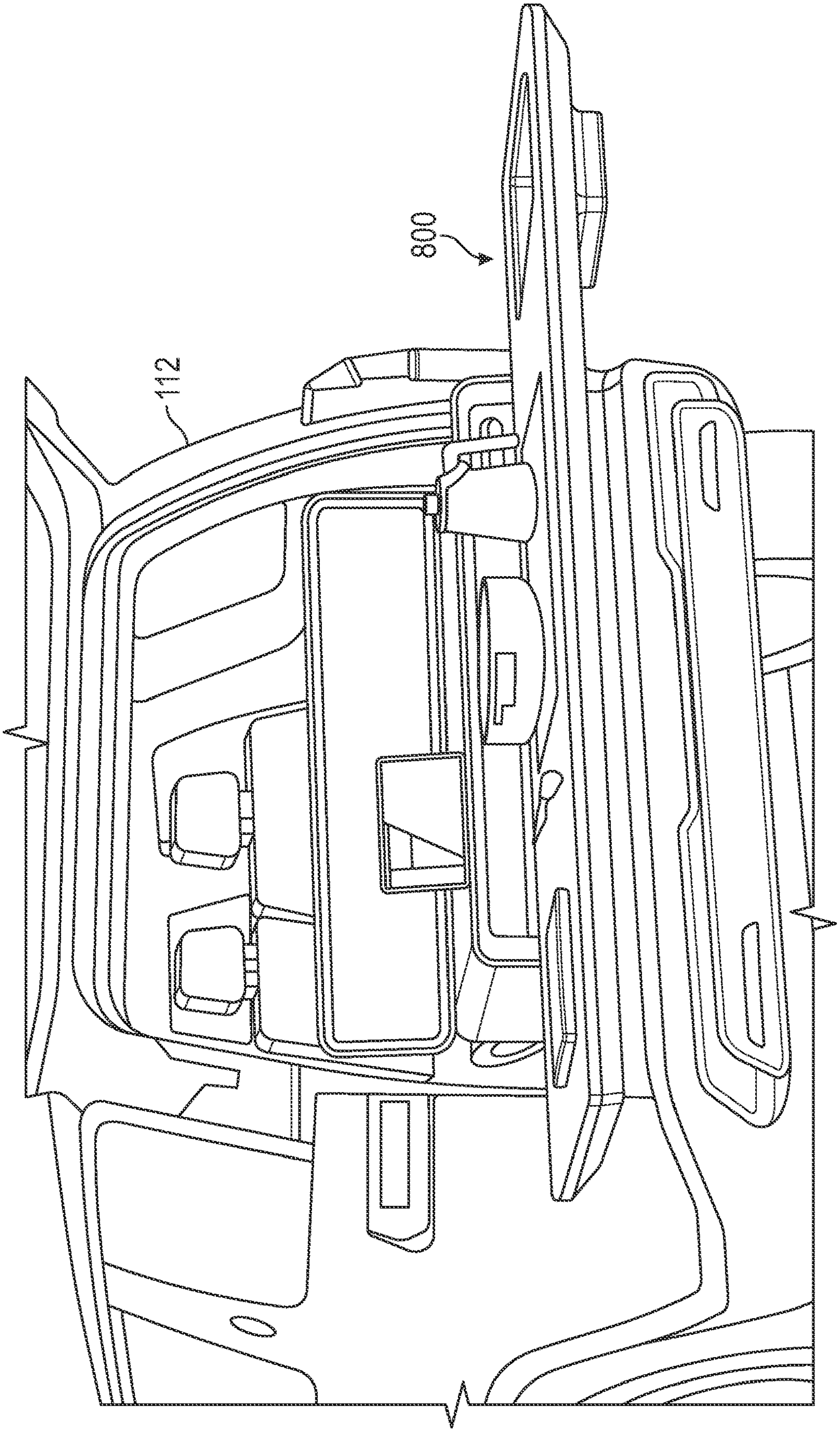
FIG. 8B depicts the induction cooktop system depicted in FIG. 8A mounted in a sport utility vehicle (SUV), in accordance with an embodiment of the present disclosure.

FIG. 8B depicts induction cooktop system 800 mounted in SUV 112, in accordance with an embodiment of the present disclosure.

Figure 8C:
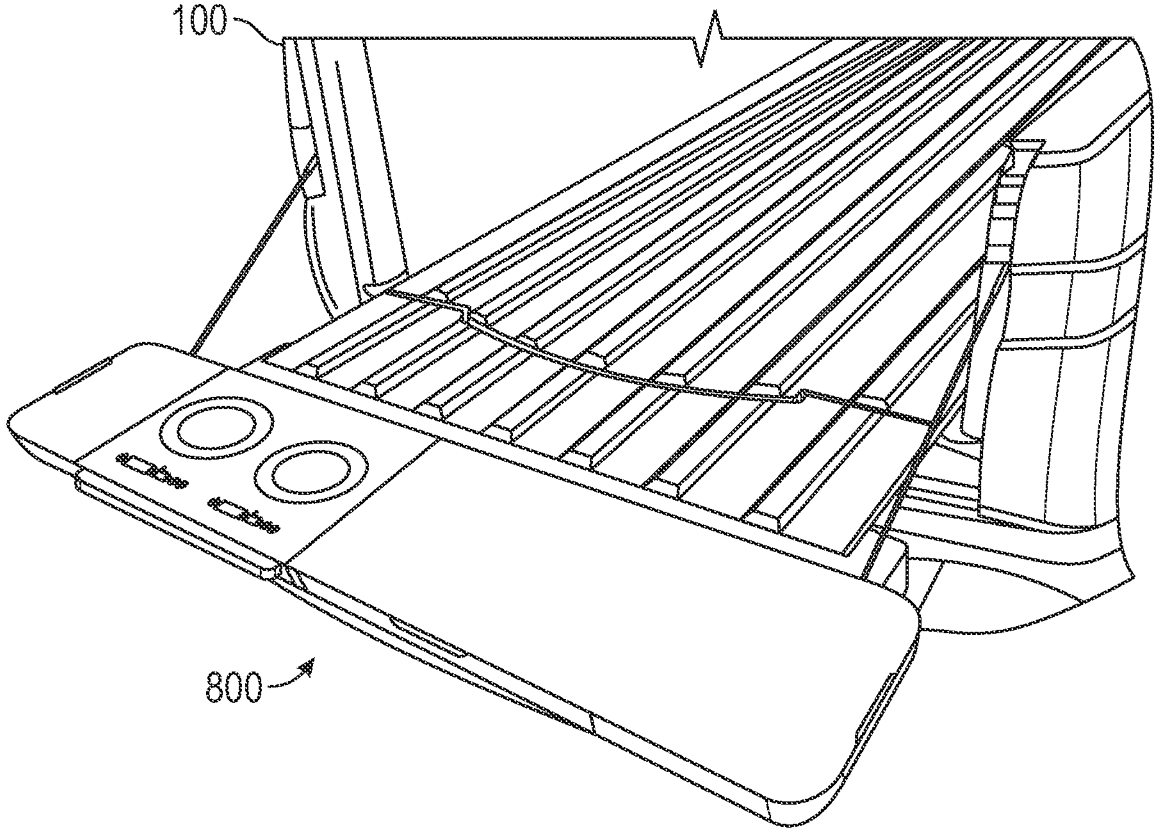
FIG. 8C depicts the induction cooktop system depicted in FIG. 8A mounted in a truck, in accordance with an embodiment of the present disclosure.

FIG. 8C depicts induction cooktop system 800 mounted in electric vehicle 100, in accordance with an embodiment of the present disclosure.

Figure 9A:
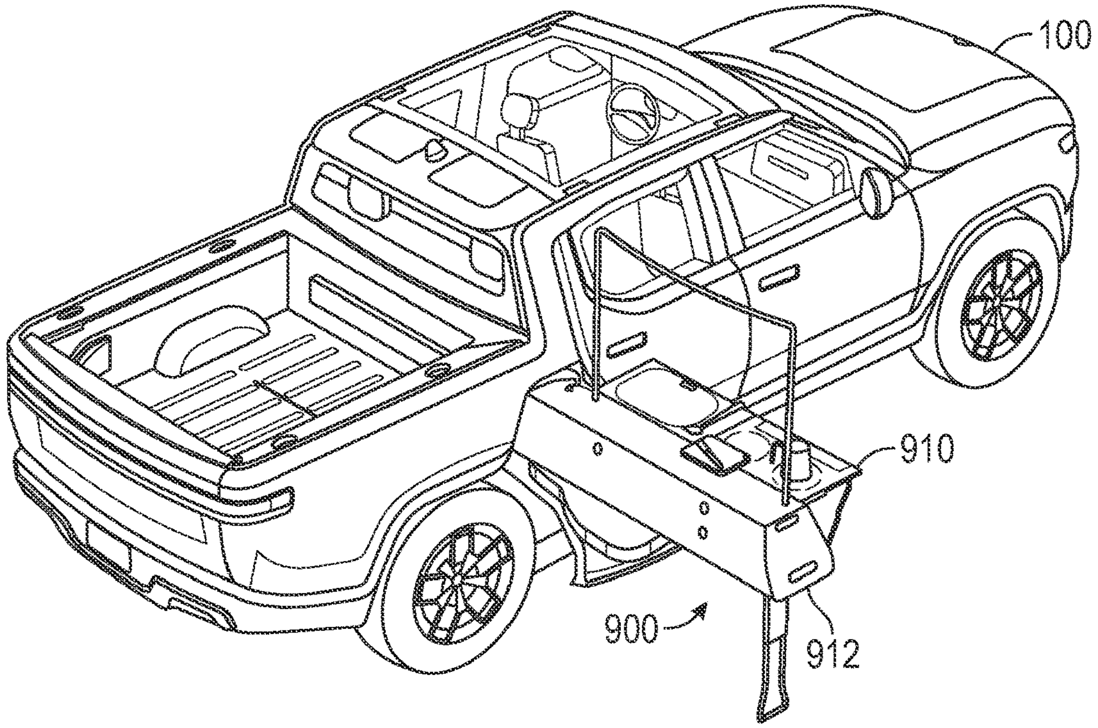
FIGS. 9A and 9B depict different views an example induction cooktop system mounted in a truck, in accordance with an embodiment of the present disclosure.
Figure 9B:
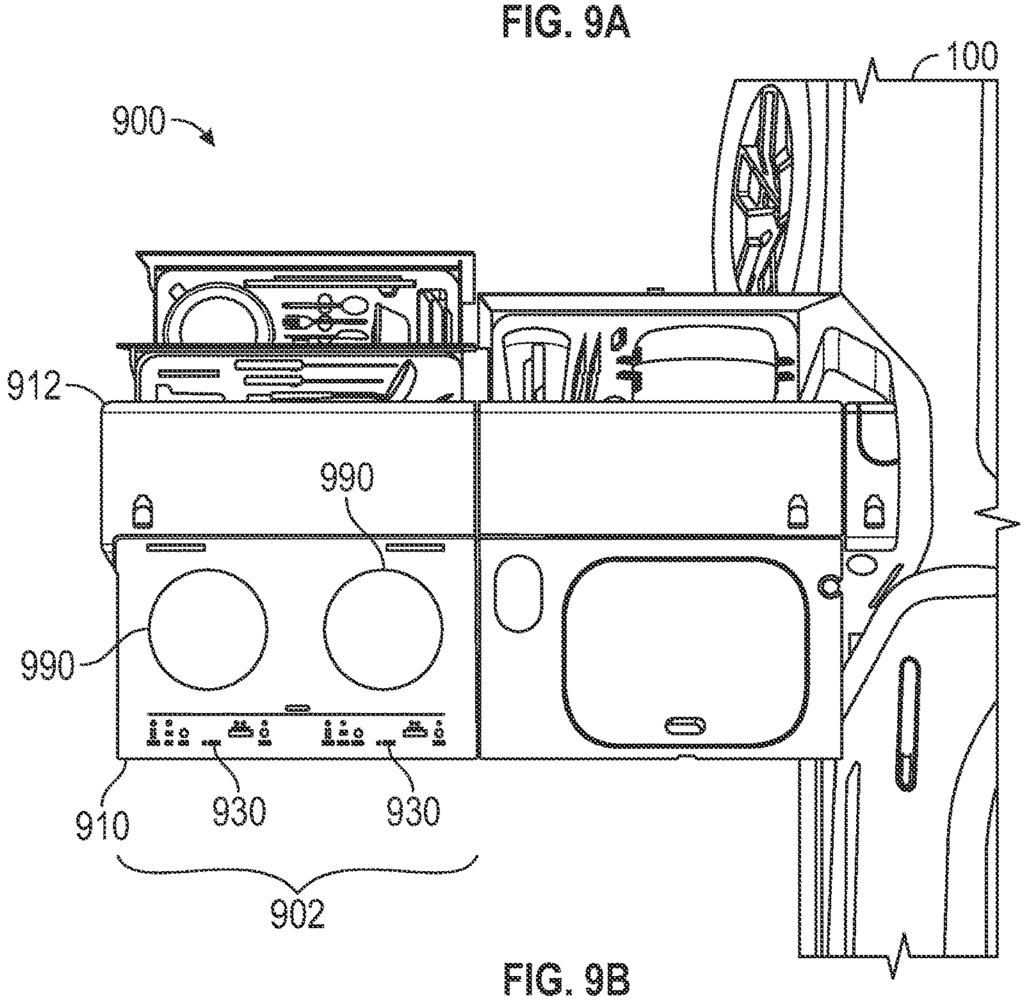

FIGS. 9A and 9B depict different views of induction cooktop system 900 mounted in a truck, in accordance with an embodiment of the present disclosure.

Induction cooktop system 900 integrates two induction cooktops (such as induction cooktops 200, 300, 400, 500, 600, 602, 604, 700, 702 described above) into induction cooktop 902 which is mounted in frame 912. Induction cooktop system 900 may integrate the same induction cooktop embodiment or different induction cooktop embodiments (e.g., induction cooktop 200 and induction cooktop 200, induction cooktop 200 and induction cooktop 300, etc.). For example, as depicted in FIG. 9B, induction cooktop 902 may include cooktop surface 910, two (or more) coils 990 and two (or more) control modules 930. Each control module 930 controls a single coil 990. Induction cooktop system 900 may be used with electric vehicle 100.

Generally, control modules 230, 630, 730 may be coupled to one or more input devices (e.g., buttons, keys, touchpad, etc.), one or more output devices (e.g., LEDs, LED or LCD displays, etc.), and one or more external sensors (e.g., cooktop surface temperature sensors, etc.), and may include various internal sensors (e.g., current sensors, voltage sensors, temperature sensors, etc.).

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An apparatus, comprising:

a cooktop surface;

an induction coil coupled to the cooktop surface;

a control module coupled to the induction coil;

at least one magnet configured to fix a ferromagnetic cookware item to the cooktop surface; and an electromagnetic shield disposed between the induction coil and the at least one magnet.

2. The apparatus of claim 1, wherein the cooktop surface comprises a glass surface, a ceramic surface or a glass-ceramic surface, and the induction coil forms a continuous loop of conductive metal wire.

3. The apparatus of claim 1, wherein the cooktop surface has a thickness between 4 mm and 8 mm.

4. The apparatus of claim 1, wherein the at least one magnet includes at least one permanent magnet disposed around the induction coil.

5. The apparatus of claim 1, wherein the at least one magnet includes a single permanent magnet disposed within an inner boundary area formed by the induction coil.

6. The apparatus of claim 1, wherein:

the control module is configured to provide an alternating current drive signal to the induction coil; and the induction coil produces an oscillating magnetic field in response to receiving the alternating current drive signal.

7. The apparatus of claim 6, wherein:

the at least one magnet is an electromagnetic coil that forms a continuous loop of conductive metal wire;

the control module is coupled to the electromagnetic coil and is further configured to provide a direct current drive signal to the electromagnetic coil; and the electromagnetic coil produces a non-oscillating magnetic field in response to receiving the direct current drive signal.

8. The apparatus of claim 1, wherein the at least one magnet is an electromagnetic coil that is disposed around the induction coil.

9. The apparatus of claim 7, wherein the induction coil is disposed around the electromagnetic coil, and an electromagnetic shield is disposed therebetween.

10. The apparatus of claim 7, wherein:

the induction coil includes an inner induction coil segment coupled to an outer induction coil segment;

the electromagnetic coil includes an inner electromagnetic coil segment coupled to an outer electromagnetic coil segment;

the inner electromagnetic coil segment is disposed within the inner induction coil segment; and the outer electromagnetic coil segment is disposed between the inner induction coil segment and the outer induction coil segment.

11. The apparatus of claim 10, further comprising:

a first electromagnetic shield disposed between the inner electromagnetic coil segment and the inner induction coil segment;

a second electromagnetic shield disposed between the inner induction coil segment and the outer electromagnetic coil segment; and a third electromagnetic shield disposed between the outer electromagnetic coil segment and the outer induction coil segment.

12. The apparatus of claim 7, wherein the control module includes a microprocessor and drive signal generation circuitry, and wherein the induction coil and the drive signal generation circuitry form an LC resonant circuit.

13. An induction cooktop, comprising:

a cooktop surface;

a coil coupled to the cooktop surface; and a control module configured to provide a drive signal to the coil, the control module comprising:

a microprocessor; and drive signal generation circuitry configured to switch the drive signal between the alternating current drive signal and the direct current drive signal, wherein, in response to receiving an alternating current drive signal, the coil produces an oscillating magnetic field to heat a ferromagnetic cookware item placed on the cooktop surface, wherein, in response to receiving a direct current drive signal, the coil produces a non-oscillating magnetic field to attract and hold the ferromagnetic cookware item to the cooktop surface, and wherein the drive signal generation circuitry provides the alternating current drive signal and the direct current drive signal to the coil at overlapping times or at the same time.

14. The induction cooktop of claim 13, wherein the cooktop surface comprises a glass surface, a ceramic surface or a glass-ceramic surface having a magnetic permeability favorable to propagation of the non-oscillating magnetic field through the cooktop surface, and wherein the coil forms a continuous loop of conductive metal wire.

15. The induction cooktop of claim 13, wherein the control module includes an asynchronous switching circuit configured to switch the drive signal between the alternating current drive signal and the direct current drive signal.

16. The induction cooktop of claim 13, wherein the drive signal generation circuitry provides the alternating current drive signal and the direct current drive signal to the coil at different times.

17. A method for an induction cooktop, comprising:

generating, by a coil, an oscillating magnetic field to heat a ferromagnetic cookware item placed on a cooktop surface in response to receiving an alternating current drive signal provided by a control module;

generating, by the coil, a non-oscillating magnetic field to attract and hold the ferromagnetic cookware item to the cooktop surface in response to receiving a direct current drive signal provided by the control module; and switching, by the control module, between the alternating current drive signal and the direct current drive signal, wherein the alternating current drive signal and the direct current drive signal are provided to the coil at overlapping times or at the same time.

18. The method of claim 17, wherein the alternating current drive signal and the direct current drive signal are provided to the coil at different times.

* * * * *